(12) United States Patent
Hosaka (10) Patent No.: US 8,127,536 B2
(45) Date of Patent: Mar. 6, 2012

(54) EXHAUST GAS CLEANING APPARATUS

(75) Inventor: Yuuichi Hosaka, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 629 days.

(21) Appl. No.: 12/056,870

(22) Filed: Mar. 27, 2008

(65) Prior Publication Data

US 2008/0276604 A1 Nov. 13, 2008

(30) Foreign Application Priority Data

May 7, 2007 (JP) ................................. 2007-122106

(51) Int. Cl.
*F01N 3/00* (2006.01)
(52) U.S. Cl. ................. 60/295; 60/274; 60/278; 60/297; 60/301; 123/568.11; 123/568.12; 123/568.18; 123/568.31
(58) Field of Classification Search ............ 60/274, 60/278, 280, 286, 287, 292, 295, 297, 298, 60/301, 311; 123/568.11, 568.12, 568.18, 123/568.31
See application file for complete search history.

(56) References Cited

U.S. PATENT DOCUMENTS

| 6,427,436 | B1 * | 8/2002 | Allansson et al. ............... 60/274 |
| 6,490,857 | B2 * | 12/2002 | Sasaki ............................. 60/278 |
| 7,086,220 | B2 * | 8/2006 | Imai et al. ....................... 60/274 |
| 7,296,401 | B2 * | 11/2007 | Asanuma et al. ............... 60/285 |
| 7,313,913 | B2 * | 1/2008 | Okugawa et al. ............... 60/295 |
| 7,334,397 | B2 * | 2/2008 | Blomquist ....................... 60/278 |
| 7,461,504 | B2 * | 12/2008 | Warner et al. ................... 60/286 |
| 7,600,373 | B2 * | 10/2009 | Matsuno et al. ................ 60/295 |
| 2005/0172613 | A1 | 8/2005 | Blomquist |
| 2006/0112679 | A1 | 6/2006 | Kojima et al. |
| 2006/0130465 | A1 | 6/2006 | Sun et al. |

FOREIGN PATENT DOCUMENTS

| DE | 103 47 834 A1 | 3/2005 |
| EP | 1 108 862 A2 | 6/2001 |
| JP | 2003-201829 A | 7/2003 |
| JP | 2005-315190 A | 11/2005 |

* cited by examiner

*Primary Examiner* — Binh Q Tran
(74) *Attorney, Agent, or Firm* — Global IP Counselors, LLP (57) ABSTRACT

An exhaust gas cleaning apparatus is provided with an exhaust gas particulate filter, an oxidation catalytic converter and a regeneration control component. The exhaust gas particulate filter is arranged in an exhaust passage of an internal combustion engine for capturing particulate matter in exhaust gas from the internal combustion engine. The oxidation catalytic converter is arranged upstream of the exhaust gas particulate filter in the exhaust passage. The regeneration control component is configured to control an exhaust gas recirculation rate and a temperature of recirculated exhaust gas being recirculated to an air induction system of the internal combustion engine for controlling a temperature of the exhaust gas particulate filter and a concentration of nitrogen dioxide in the exhaust gas particulate filter such that nitrogen dioxide generated by the oxidation catalytic converter is used to burn the particulate matter captured in the exhaust gas particulate filter.

26 Claims, 9 Drawing Sheets

|  |  | DPF TEMPERATURE | | |
|---|---|---|---|---|
|  |  | HIGH | OPTIMUM | LOW |
| NO₂ CONCENTRATION | HIGH | REDUCE BYPASS EXHAUST GAS AMOUNT OPEN EGR VALVE | REDUCE BYPASS EXHAUST GAS AMOUNT OPEN EGR VALVE | INCREASE BYPASS EXHAUST GAS AMOUNT OPEN EGR VALVE |
|  | OPTIMUM | REDUCE BYPASS EXHAUST GAS AMOUNT CLOSE EGR VALVE | NO ADJUSTMENTS | INCREASE BYPASS EXHAUST GAS AMOUNT OPEN EGR VALVE |
|  | LOW | REDUCE BYPASS EXHAUST GAS AMOUNT CLOSE EGR VALVE | INCREASE BYPASS EXHAUST GAS AMOUNT CLOSE EGR VALVE | INCREASE BYPASS EXHAUST GAS AMOUNT OPEN EGR VALVE |

*FIG. 10*

EXHAUST GAS CLEANING APPARATUS

CROSS-REFERENCE TO RELATED APPLICATIONS

This application claims priority to Japanese Patent Application No. 2007-122106, filed on May 7, 2007. The entire disclosure of Japanese Patent Application No. 2007-122106 is hereby incorporated herein by reference.

BACKGROUND OF THE INVENTION

1. Field of the Invention

The present invention generally relates to an exhaust gas cleaning apparatus for an internal combustion engine. More specifically, the present invention relates to an exhaust gas cleaning apparatus that removes exhaust gas particulate matter captured in an exhaust gas particulate filter arranged in a downstream position by oxidizing the particulate matter using nitrogen dioxide ($NO_2$) generated by an oxidation catalytic converter arranged in an upstream position.

2. Background Information

There are various known technologies for cleaning exhaust gas discharged from an engine. For example, Japanese Laid-Open Patent Publication No. 2005-315190 discloses a known exhaust gas cleaning apparatus for a diesel engine. Here, the exhaust gas cleaning apparatus is a continuously regenerating apparatus having an exhaust gas particulate filter that captures exhaust gas particulate matter and an oxidation catalytic converter arranged upstream of the exhaust gas particulate filter. While the engine is running, the apparatus continuously removes exhaust gas particulate matter captured in the exhaust gas particulate filter by oxidizing the particulate matter with nitrogen dioxide generated by the oxidation catalytic converter. The nitrogen dioxide serves as a highly active oxidizing agent.

In view of the above, it will be apparent to those skilled in the art from this disclosure that there exists a need for an improved internal combustion engine exhaust gas cleaning apparatus. This invention addresses this need in the art as well as other needs, which will become apparent to those skilled in the art from this disclosure.

SUMMARY OF THE INVENTION

It has been discovered that in when the particulate matter captured in the exhaust gas particulate filter is continuously removed by oxidation using nitrogen dioxide as described above, the particulate matter can be removed in a highly efficient manner by controlling the temperature of the filter and the concentration of the nitrogen dioxide in the filter to optimum values.

However, the apparatus described above is not provided with a device for controlling both the temperature of the filter and the concentration of the nitrogen dioxide in the filter to optimum values. If, for example, the concentration of nitrogen oxides (NOx) discharged from the engine is controlled by exhaust gas recirculation (EGR), then the change in the exhaust gas recirculation rate will cause the intake air temperature to change, thus causing the filter temperature to change. In short, it is difficult to control both the filter temperature and the concentration of nitrogen dioxide ($NO_2$) in the filter to optimum values simultaneously.

The present invention was conceived in view of this difficulty. One object of the present invention is to provide an exhaust gas cleaning apparatus that can control both the temperature of the exhaust gas particulate filter and the concentration of nitrogen dioxide ($NO_2$) in the exhaust gas particulate filter to optimum values simultaneously and, thereby, execute continuous regeneration in an efficient manner using nitrogen dioxide.

In view of the above, an exhaust gas cleaning apparatus is provided with that basically comprises an exhaust gas particulate filter, an oxidation catalytic converter and a regeneration control component. The exhaust gas particulate filter is arranged in an exhaust passage of an internal combustion engine for capturing particulate matter in exhaust gas from the internal combustion engine. The oxidation catalytic converter is arranged upstream of the exhaust gas particulate filter in the exhaust passage. The regeneration control component is configured to control an exhaust gas recirculation rate and a temperature of recirculated exhaust gas being recirculated to an air induction system of the internal combustion engine for controlling a temperature of the exhaust gas particulate filter and a concentration of nitrogen dioxide in the exhaust gas particulate filter such that nitrogen dioxide generated by the oxidation catalytic converter is used to burn the particulate matter captured in the exhaust gas particulate filter.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
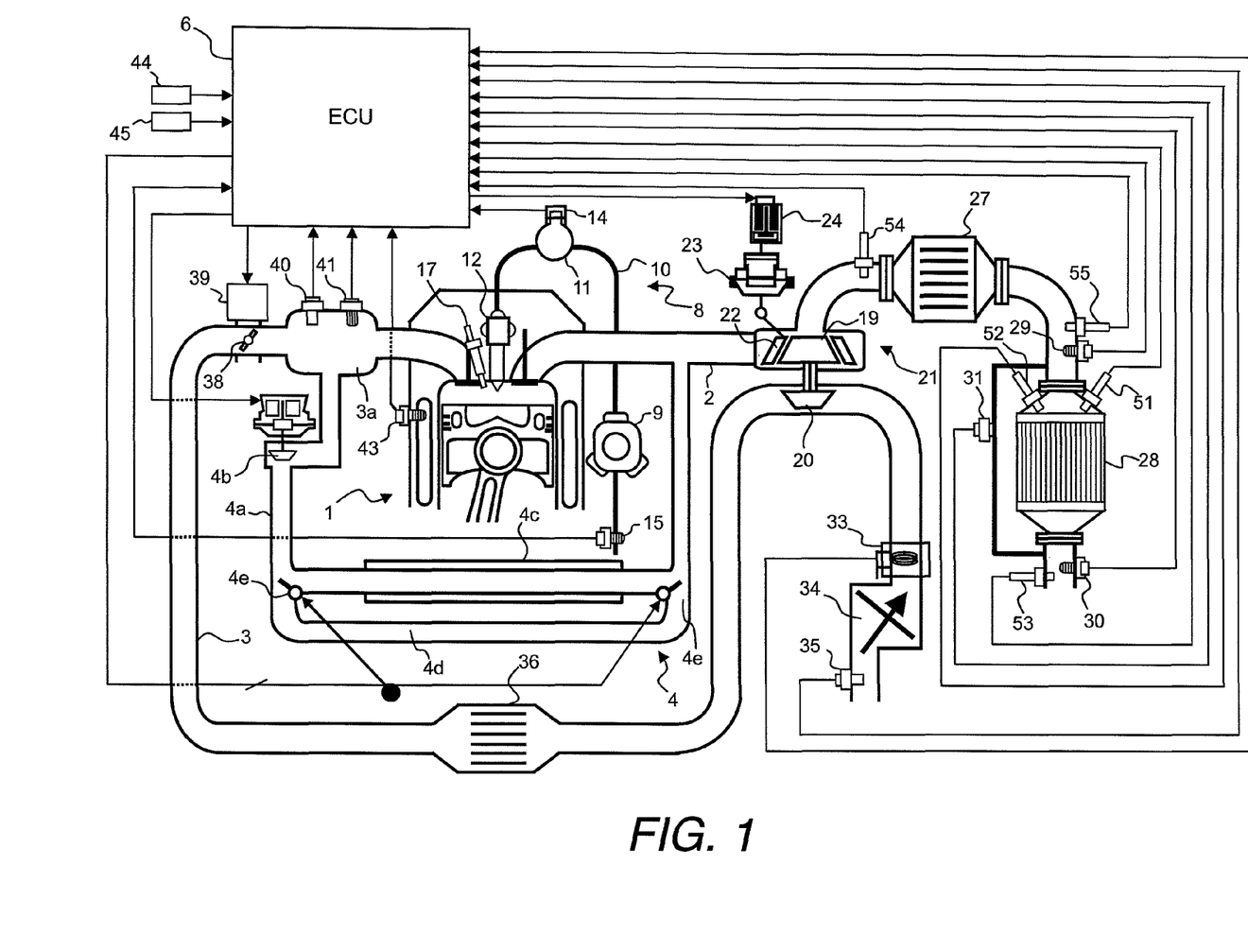
FIG. 1 is schematic block diagram of an internal combustion engine (e.g., a diesel engine) with an exhaust gas cleaning apparatus in accordance with one illustrated embodiment.

Referring initially to FIG. 1, an internal combustion engine 1 (e.g., a diesel engine) is illustrated with an exhaust gas cleaning apparatus in accordance with a first embodiment. The diesel engine 1 has an exhaust passage 2 to expel the exhaust gas from the combustion chamber of the diesel engine 1 and an intake passage 3 for introducing intake air into the combustion chamber of the diesel engine 1. The exhaust passage 2 equipped with an exhaust gas recirculation apparatus (EGR system) 4 for recirculating a portion of exhaust gas to an air induction system of the intake passage 3.

The exhaust gas recirculation apparatus 4 basically includes an exhaust gas recirculation passage 4a having an exhaust gas recirculation (EGR) control valve 4b, a cooler 4c, a bypass passage 4d and a pair of selector valves 4e. The exhaust gas recirculation passage 4a is arranged to communicate between the exhaust passage 2 and a collector section 3a of the intake passage 3. The exhaust gas recirculation control valve 4b is arranged in the exhaust gas recirculation passage 4a with its opening degree controlled with an actuator. The cooler 4c is arranged to cool exhaust gas passing through the exhaust gas recirculation passage 4a. The bypass passage 4d is arranged to allow exhaust gas passing through the exhaust gas recirculation passage 4a to bypass the cooler 4c. The selector valves 4e are arranged at a portion where the bypass passage 4c branches from the exhaust gas recirculation passage 4a and at a portion where the bypass passage 4c merges with the exhaust gas recirculation passage 4a. The selector valves 4e serve to vary a ratio of an amount of exhaust gas that flows through the cooler 4c and an amount of exhaust gas that flows through the bypass passage 4d.

The exhaust gas recirculation valve 4b and the selector valves 4e are each driven by a motor or other actuator. The actuators are controlled by an electronic control unit (ECU) or controller 6.

The electronic control unit 6 preferably includes an internal microcomputer with an exhaust gas control program that controls the exhaust gas temperature of the engine 1 and the amount of exhaust gas that is recirculated as discussed below. The electronic control unit 6 can also include other conventional components such as an input/output interface (I/O interface), and storage devices such as a ROM (Read Only Memory) device and a RAM (Random Access Memory) device. The microcomputer of the electronic control unit 6 is programmed to control, for example, the fuel injection timing and the fuel injection amount from the injectors. The electronic control unit 6 is operatively coupled to the various components of the engine 1 in a conventional manner. The internal RAM of the electronic control unit 6 stores statuses of operational flags and various control data. The internal ROM of the electronic control unit 6 stores the various maps and data for various operations. The electronic control unit 6 is capable of selectively controlling any of the components of the control system in accordance with the control program. It will be apparent to those skilled in the art from this disclosure that the precise structure and algorithms for the electronic control unit 6 can be any combination of hardware and software that will carry out the functions of the present invention.

The cooler 4c is, for example, a water-cooled cooler that utilizes coolant from the engine 1. However, the invention is not limited to a water-cooled the cooler.

The internal combustion engine 1 is a fuel injection engine provided with a common rail type fuel injection apparatus 8. The common rail fuel injection apparatus 8 has a fuel pipe 10, a supply pump 9, a common rail 11, and a fuel injection nozzle 12 for each cylinder. Fuel pressurized by the supply pump 9 is supplied to the common rail 11 through the fuel pipe 10, and high pressure fuel is distributed from the common rail 11 to the fuel injection nozzles 12.

The fuel pressure inside the common rail 11 is adjusted by a pressure regulator (not shown) and the fuel pressure inside the common rail 11 is detected by a fuel pressure sensor 14 provided on the common rail 11. A pressure temperature sensor 15 is arranged in a position upstream of the supply pump 9 for detecting a fuel temperature.

A glow plug 17 is arranged in the combustion chamber of each of the cylinders.

The engine 1 is also provided with a turbocharger 21 having an exhaust gas turbine 19 and a compressor 20 connected together in a coaxial arrangement. The exhaust gas turbine 19 is arranged in the exhaust passage 2 at a position downstream of where the exhaust gas recirculation passage 4a branches from the exhaust passage 2. A variable nozzle 22 is provided in a scroll inlet of the exhaust gas turbine 19. The variable nozzle 22 is driven by a diaphragm type actuator 23 that operates in response to a control pressure (control negative pressure), and the control pressure is generated by a duty-controlled pressure control valve 24.

When the opening degree of the variable nozzle 22 is small, the turbocharger 21 assumes a small capacity characteristic suited to an operating condition in which the exhaust gas flow rate is small. When the opening degree of the variable nozzle 22 is large, the turbocharger 21 assumes a large capacity characteristic suited to an operating condition in which the exhaust gas flow rate is large.

An oxidation catalytic converter 27 is arranged in the exhaust passage 2 at a position downstream of the exhaust gas turbine 19, and a particulate matter capturing filter (diesel particulate filter: DPF) 28 is arranged downstream of the oxidation catalytic converter 27. The oxidation catalytic converter 27 comprises chiefly a precious metal (e.g., platinum) held on a carrier substrate.

The particulate filter 28 is further configured to capture and remove particulate matter (PM) from exhaust gas. The particulate filter 28 has a wall-flow honeycomb structure (so-called flanged type) that includes, for example, a rod-shaped filter material (e.g., cordierite) in which multiple narrow passages are formed therein in a honeycomb-like manner. Alternating ends of the passages are blocked (closed). In other words, the inlets of alternating flow passages are blocked, while the outlets of the flow passages whose inlets are open (not blocked) are blocked.

An exhaust gas temperature sensor 29 is arranged at the inlet side of the particulate filter 28 and an exhaust gas temperature sensor 30 is arranged at the outlet side of the particulate filter 28 for measuring the exhaust gas temperature at the inlet and outlet sides of the particulate filter 28, respectively. The temperature of the particulate filter 28 can be estimated based on the detection results of the exhaust gas temperature sensor 29 and/or the exhaust gas temperature sensor 30.

The pressure difference (pressure loss) across the particulate filter 28 changes as particulate matter accumulates in the particulate filter 28, and the amount of accumulated particulate matter can be estimated based on this pressure difference.

Therefore, a pressure difference sensor 31 is provided to detect the pressure difference between the inlet side and outlet side of the particulate filter 28.

A NOx sensor 51 and an oxygen sensor 52 are provided in positions immediately upstream of the filter element of the particulate filter 28, and an oxygen sensor 53 is provided in a position immediately downstream of the particulate filter 28. The NOx sensor 51 serves to detect a concentration of NOx (both NO and $NO_2$) in the exhaust gas and the oxygen sensor 52 serves to detect if the air fuel ratio of the exhaust gas is stoichiometric. The oxygen sensor 53 serves to detect of the air fuel ratio of the exhaust gas exiting the filter 28 is stoichiometric.

Wide range air fuel ratio sensors 54 and 55 contrived to detect the air fuel ratio of an exhaust gas over a wide range are arranged upstream and downstream, respectively, of the oxidation catalytic converter 27.

The compressor 20 of the turbocharger 21 is arranged in the intake passage 3. An air flow meter 33 detects an intake air flow rate is arranged upstream of the compressor 20, and an air cleaner 34 is arranged upstream of the air flow meter 33. An atmospheric pressure sensor 35 detects an atmospheric pressure is arranged on an inlet side of the air cleaner 34.

An intercooler 36 is arranged between the compressor 20 and the collector section 3a for cooling the high-temperature supercharged intake air. An intake throttle valve 38 limits the amount of fresh air drawn into the engine 1 is arranged in the intake passage 3 on the inlet side of the collector section 3a. The intake throttle valve 38 is driven (open and closed) with an actuator 39 comprising a stepping motor or other actuating device. The actuator 39 is controlled with a control signal from the electronic control unit 6.

A supercharging pressure sensor 40 detects a supercharging pressure and an intake air temperature sensor 41 detects a temperature of the intake air are arranged in the collector section 3a.

The apparatus is also provided with coolant sensor 43, a crank angle sensor 44, and an accelerator position sensor 45. The coolant sensor 43 detects a coolant temperature of the engine 1. The crank angle sensor 44 detects a rotational angle of a crankshaft. The accelerator position sensor 45 detects a depression amount (position) of an accelerator pedal.

The electronic control unit 6 is further configured to control a fuel injection quantity and a supercharge pressure of the internal combustion engine 1 and to control the regeneration of the particulate filter 28.

Regeneration of the particulate filter 28 includes a continuous regeneration that uses nitrogen dioxide ($NO_2$) produced by the oxidation catalytic converter 27 and a forced temperature increase regeneration for greatly increasing the temperature of the particulate filter 28 in comparison with normal operation by restricting the flow of intake air so as to achieve a rich air fuel ratio, regarding the timing of a main fuel injection, or by executing a post fuel injection. In this embodiment, in order to execute the continuous regeneration efficiently, the electronic control unit 6 executes a continuous regeneration control that is further configured to control both the temperature of the particulate filter 28 and the concentration of nitrogen dioxide in the particulate filter 28 to respective target values.

Thus, the electronic control unit 6 of the exhaust gas cleaning apparatus constitutes a regeneration control component and a forced temperature increase regeneration component by carrying out the functions of a regeneration control and a forced temperature increase regeneration control.

As explained below, the electronic control unit 6 of the exhaust gas cleaning apparatus exhaust gas cleaning apparatus controls both the temperature of an exhaust gas particulate filter 28 and the concentration of nitrogen dioxide ($NO_2$) in the exhaust gas particulate filter 28 to optimum values simultaneously by controlling the amount of exhaust gas that is recirculated and the amount of recirculated exhaust gas that bypasses the cooler 4c. The amount of exhaust gas recirculated is controlled by controlling the exhaust gas recirculation control valve 4b. The amount of recirculated exhaust gas that bypasses the cooler 4c is controlled by controlling the selector valves 4e. With the illustrated embodiment, the amount of nitrogen oxides (NOx) discharged from the engine 1 can be controlled by increasing and decreasing the rate at which exhaust gas is recirculated to the air induction system of the engine 1. By controlling the amount of nitrogen oxides (NOx) discharged from the engine 1, the amount of NOx that is oxidized in the oxidation catalytic converter 27 can be controlled and, thus, the concentration of nitrogen dioxide ($NO_2$) flowing into the exhaust gas particulate filter 27 can be controlled.

For example, if the exhaust gas recirculation rate (exhaust gas recirculation amount) is increased in order to decrease the concentration of nitrogen dioxide ($NO_2$), then the temperature of the intake air will increase and the exhaust gas temperature will increase, ultimately causing the temperature of the exhaust gas particulate filter 28 to increase. However, by lowering the temperature of the recirculated exhaust gas, the increase in the filter temperature can be suppressed.

Also, if the temperature of the recirculated exhaust gas is increased in order to raise the temperature of the exhaust gas particulate filter 28, then the density of the recirculated exhaust gas will decrease and the actual exhaust gas recirculation rate will decrease. However, by simultaneously increasing the exhaust gas recirculation amount, the exhaust gas recirculation rate can be held substantially constant and, as a result, the concentration of nitrogen dioxide in the filter can be maintained. Thus, both the temperature of the exhaust gas particulate filter 28 and the concentration of nitrogen dioxide ($NO_2$) in the exhaust gas particulate filter 28 can be controlled to optimum values during continuous regeneration.

Furthermore, the temperature of the recirculated exhaust gas can be adjusted by controlling a degree to which the recirculated exhaust gas is cooled. For example, by providing the cooler 4c and the cooler bypass passage 4d in the exhaust gas recirculation passage 4a, the temperature of the recirculated exhaust gas can be adjusted by controlling a ratio of the amount of exhaust gas passed through the cooler 4c and the amount of exhaust gas allowed to bypass the cooler 4c.

Figure 2:
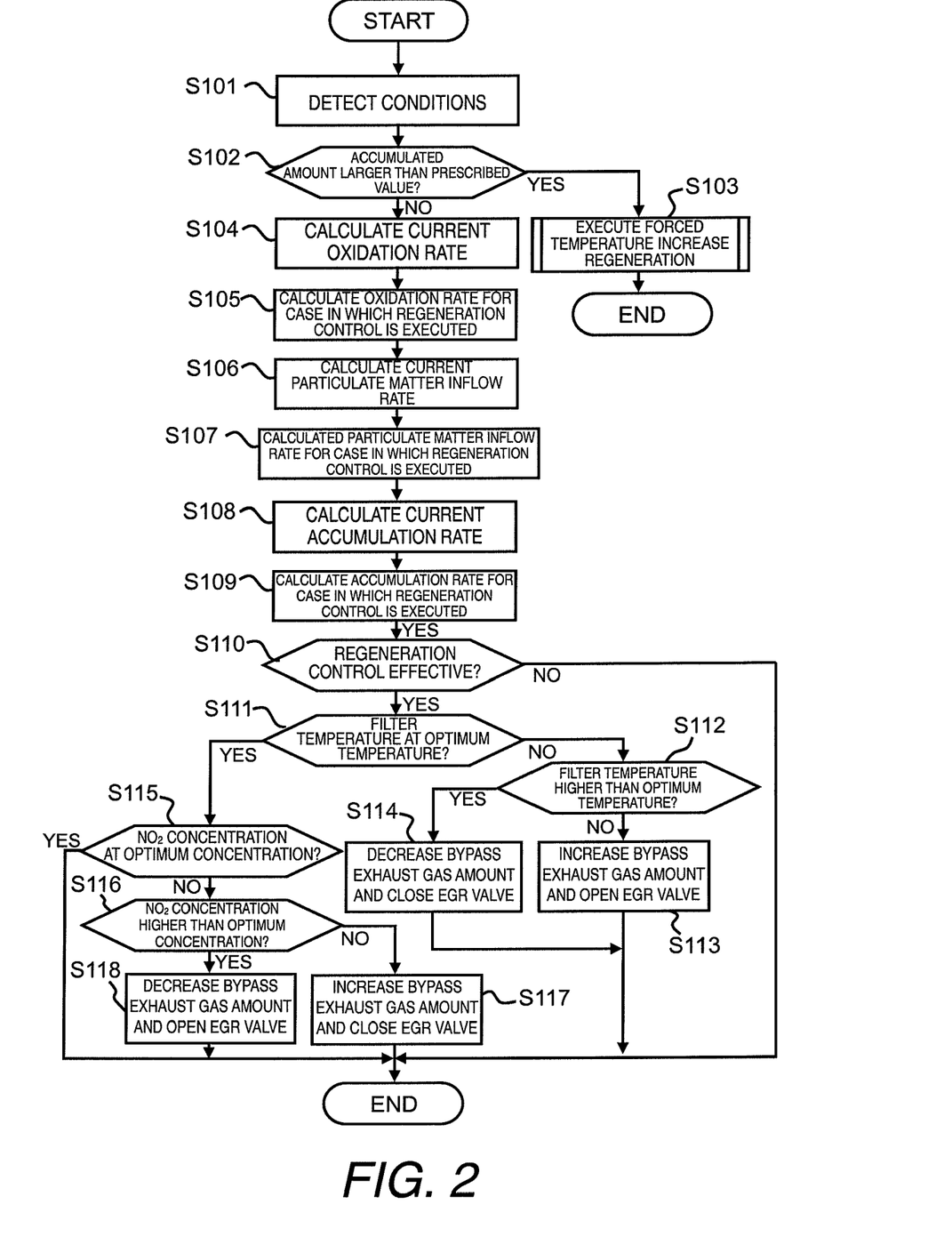
FIG. 2 is a flowchart of the control routine executed by the engine control unit to conduct a continuous regeneration control in accordance with the illustrated embodiment.

The flowchart of FIG. 2 shows the control steps executed by the electronic control unit 6 in order accomplish the continuous regeneration of the particulate filter 28.

First, in step S101 of the flowchart shown in FIG. 2, the electronic control unit 6 detects various operating conditions.

The operating conditions include a fuel injection quantity QF (engine load), an engine rotational speed NE (rpm), a pressure difference across the particulate filter 28 (amount of accumulated particulate matter), and an exhaust gas temperature at the inlet of the particulate filter 28 (filter temperature).

In step S102, the electronic control unit 6 determines if an amount of accumulated particulate matter estimated based on the pressure difference across the particulate filter 28 detected by the pressure sensor 31 is larger than a prescribed value set based on a saturation amount.

If the amount of accumulated particulate matter exceeds the prescribed value, then the electronic control unit 6 proceeds to step S103 and executes a forced temperature increase regeneration control because the amount of accumulated particulate matter is near the saturation amount and it is necessary to remove the particulate matter by oxidation immediately.

Figure 3:
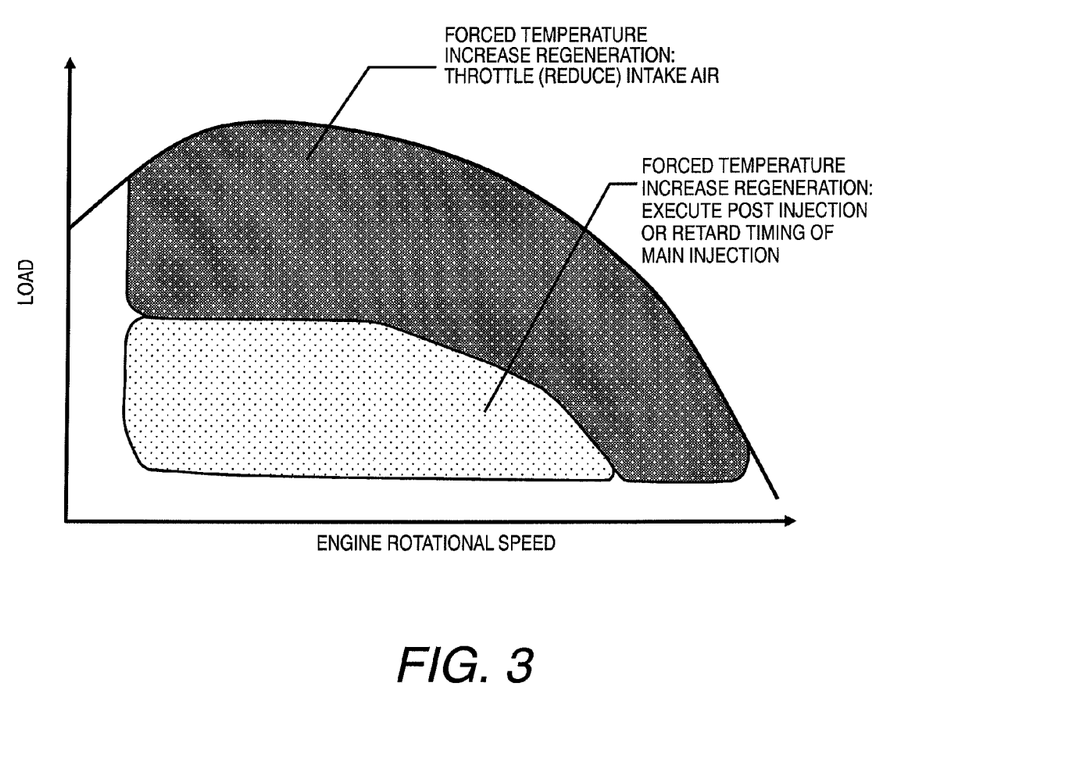
FIG. 3 is a graph illustrating how the method of executing forced temperature increase regeneration control is selected in the illustrated embodiment.

During the forced temperature increase regeneration control of step S103, the temperature of the particulate filter 28 is raised greatly by controlling the throttle valve 38 such that the air fuel ratio becomes rich or by retarding a main injecting timing or executing a post fuel injection. Which control scheme will be used to raise the temperature of the particulate filter 28 is determined based on the engine speed Ne (rpm) or the fuel injection quantity QF (engine load) as shown in FIG. 3.

In either case, i.e., regardless of whether the throttle valve 38 is controlled such that the air fuel ratio becomes rich or whether a main injecting timing is retarded or a post fuel injection is executed, the amount of unburned components (HC) in the exhaust gas increases and it is the oxidation of the unburned components in the exhaust system that causes the temperature of the particulate filter 28 to rise. The temperature of the particulate filter 28 is raised to, for example, 600° C. and the particulate matter accumulated in the particulate filter 28 is removed by oxidation.

Meanwhile, if the amount of particulate matter accumulated in the particulate filter 28 is equal to or smaller than the prescribed value, then the forced temperature increase regeneration control is not executed. Instead a continuous regeneration control is executed in which nitrogen dioxide ($NO_2$) produced by the oxidation catalytic converter 27 is introduced into the particulate filter 28 and the particulate matter captured in the particulate filter 28 is removed at a comparatively low temperature by oxidizing the particulate matter with the nitrogen oxide (the nitrogen dioxide serves as a highly active oxidizing agent). The continuous regeneration control can be accomplished in an efficient manner by actively controlling both the temperature of the filter 28 and the nitrogen dioxide. Therefore, the electronic control unit 6 proceeds to step S104 and executes computations for executing the continuous regeneration control.

Steps S104 through S110 serve to determine if executing continuous regeneration control will accelerate regeneration of the particulate filter 28 (oxidation removal of the particulate matter). It is not necessary to execute continuous regeneration control if regeneration cannot be accelerated by doing so.

In step S104, the electronic control unit 6 estimates a particulate matter oxidation removal rate (amount of particulate matter removed from the filter 28 by oxidation per unit time) that will result if continuous regeneration is not executed. The estimate is calculated based on a temperature of the filter 28 determined based on current operating conditions, an amount of accumulated particulate matter at the current point in time, and a concentration of nitrogen dioxide in the filter 28 at the current point in time.

More specifically, the temperature of the filter 28 (exhaust gas temperature) is estimated based on the current fuel injection quantity QF (engine load) and the engine speed NE, the amount of accumulated particulate matter is estimated based on the pressure across the particulate filter 28 detected by the pressure sensor 31, and the NOx concentration is detected by the NOx sensor 51. These values are then used to estimate the particulate matter oxidation removal rate that will occur if continuous regeneration control is not executed.

When estimating amount of particulate matter, it is preferable to take the exhaust gas flow rate and the filter temperature into account in addition to the pressure difference across the particulate filter 28.

Figure 4:
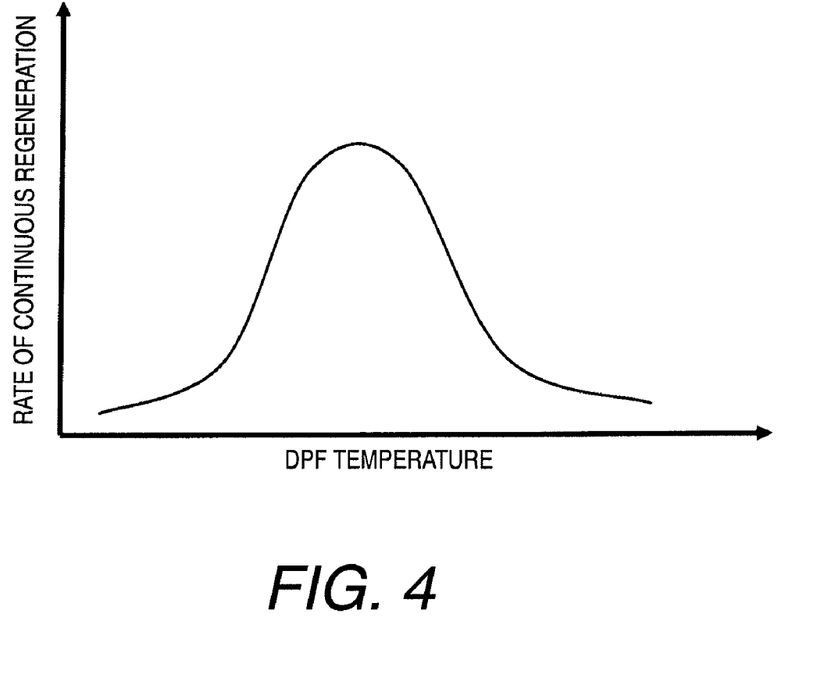
FIG. 4 is a characteristic diagram plotting a correlation between a filter temperature and a rate of continuous regeneration.

As shown in FIG. 4, an optimum temperature (e.g., 300° C.) of the filter 28 exists at which continuous regeneration can be conducted effectively. At the optimum temperature, the rate at which exhaust gas particulate matter is removed by oxidation with nitrogen dioxide ($NO_2$) is higher than at any other temperature. The rate of oxidation removal decreases if the temperature is higher or lower than the optimum temperature.

Figure 5:
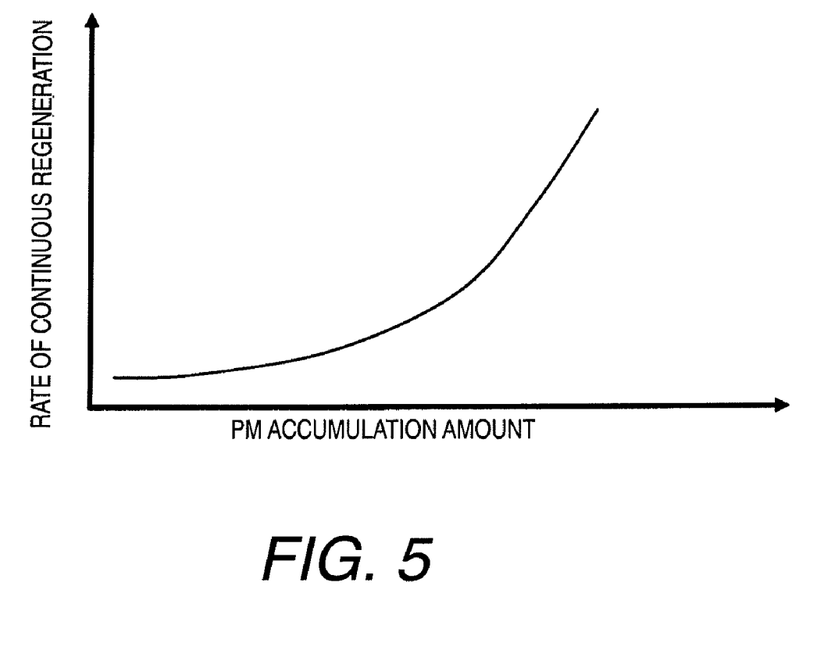
FIG. 5 is a characteristic diagram plotting a correlation between a particulate matter accumulation amount and a rate of continuous regeneration.

The oxidation proceeds in a chain reaction like manner when the amount of particulate matter accumulated in the filter 28 is large. As shown in FIG. 5, the larger the amount of accumulated particulate matter is, the higher the oxidation removal rate is.

Additionally, an optimum value of the nitrogen dioxide ($NO_2$) concentration exists at which continuous regeneration can be conducted effectively. When the $NO_2$ concentration in the filter 28 is at the optimum value, the rate at which exhaust gas particulate matter is removed by oxidation is higher than at any other concentration value. The rate of oxidation removal decreases if the $NO_2$ concentration is higher or lower than the optimum concentration.

The optimum value of the $NO_2$ concentration is determined based on the amount of accumulated particulate matter; the higher the amount of accumulated particulate matter is, the higher the optimum value of the $NO_2$ concentration is set.

In step S105, the electronic control unit 6 estimates a particulate matter oxidation removal rate that will result if continuous regeneration is executed. The estimate is calculated based on a target value of the temperature of the filter 28 (exhaust gas temperature) during continuous regeneration control, an amount of accumulated particulate matter estimated based on a pressure across the particulate filter 28 detected by the pressure difference sensor 31, and a target value of the $NO_2$ concentration during the continuous regeneration control.

The target temperature and target concentration during continuous regeneration control mentioned above are an optimum temperature and optimum concentration at which the particulate matter oxidation rate is highest.

In step S106, the electronic control unit 6 estimates a rate at which particulate matter is flowing into the particulate filter 28 (amount of particulate matter flowing in per unit time) at the current point in time based on current operating conditions (i.e., fuel injection quantity QF, engine speed NE, exhaust gas temperature (temperature of oxidation catalytic converter 27), etc.).

In step S107, the electronic control unit 6 estimates a rate at which particulate matter would flow into the particulate filter 28 (amount of particulate matter flowing in per unit time) if continuous regeneration control was executed based on operating conditions (i.e., fuel injection quantity QF, engine speed NE, exhaust gas temperature (temperature of oxidation catalytic converter 27), etc.) that would exist if the continuous regeneration control was executed.

In step S108, the electronic control unit 6 calculates a particulate matter accumulation rate for a case in which continuous regeneration control is not executed by finding a difference between the particulate matter oxidation removal rate for a case in which continuous regeneration control is not executed (calculated in step S104) and the current rate at which particulate matter flows into the particulate filter 28 (calculated in step S106).

In other words, if the oxidation removal rate is faster than the inflow rate (if the oxidation removal amount is larger than the inflow amount), then the amount of accumulated particulate matter will decrease. Conversely, if the oxidation removal rate is slower than the inflow rate (if the oxidation removal amount is smaller than the inflow amount), then the amount of accumulated particulate matter will increase.

The expressions "if the continuous regeneration control is not executed" and "a case in which continuous regeneration control is not executed" refer to a case in which the temperature of the filter 28 and the $NO_2$ concentration in the filter 28 are not actively controlled to the optimum values for continuous regeneration. These expressions do not mean that continuous regeneration in which particulate matter is removed by oxidation using nitrogen dioxide ($NO_2$) does not occur.

In step S109, the electronic control unit 6 calculates a particulate matter accumulation rate for a case in which continuous regeneration control is executed by finding a difference between the particulate matter oxidation removal rate for a case in which continuous regeneration control is executed (calculated in step S105) and the rate at which particulate matter would flow into the particulate filter 28 under operating conditions that would occur a case in which continuous regeneration control is executed (calculated in step S106).

In step S110, the electronic control unit 6 compares the particulate matter accumulation rate calculated in step S108 (i.e., the particulate matter accumulation rate for a case in which continuous regeneration control is not executed) to the particulate matter accumulation rate calculated in step S109 (i.e., the particulate matter accumulation rate for a case in which continuous regeneration control is executed).

If the particulate matter accumulation rate (amount accumulated per unit time) calculated for a case in which continuous regeneration control is executed) is slower (smaller) than the particulate matter accumulation rate (amount accumulated per unit time) calculated for a case in which continuous regeneration control is executed, then the electronic control unit 6 proceeds to step S111 and subsequent steps and executes continuous regeneration control because executing continuous regeneration control will accelerate the regeneration of (i.e., the oxidation removal of exhaust gas particulate matter from) the particulate filter 28.

Conversely, if the particulate matter accumulation rate (amount accumulated per unit time) calculated for a case in which continuous regeneration control is executed) is faster (larger) than the particulate matter accumulation rate (amount accumulated per unit time) calculated for a case in which continuous regeneration control is executed, then the electronic control unit 6 ends the routine without executing the continuous regeneration control because executing the continuous regeneration control will not improve the efficiency of the continuous regeneration of the particulate filter 28.

Figure 6:
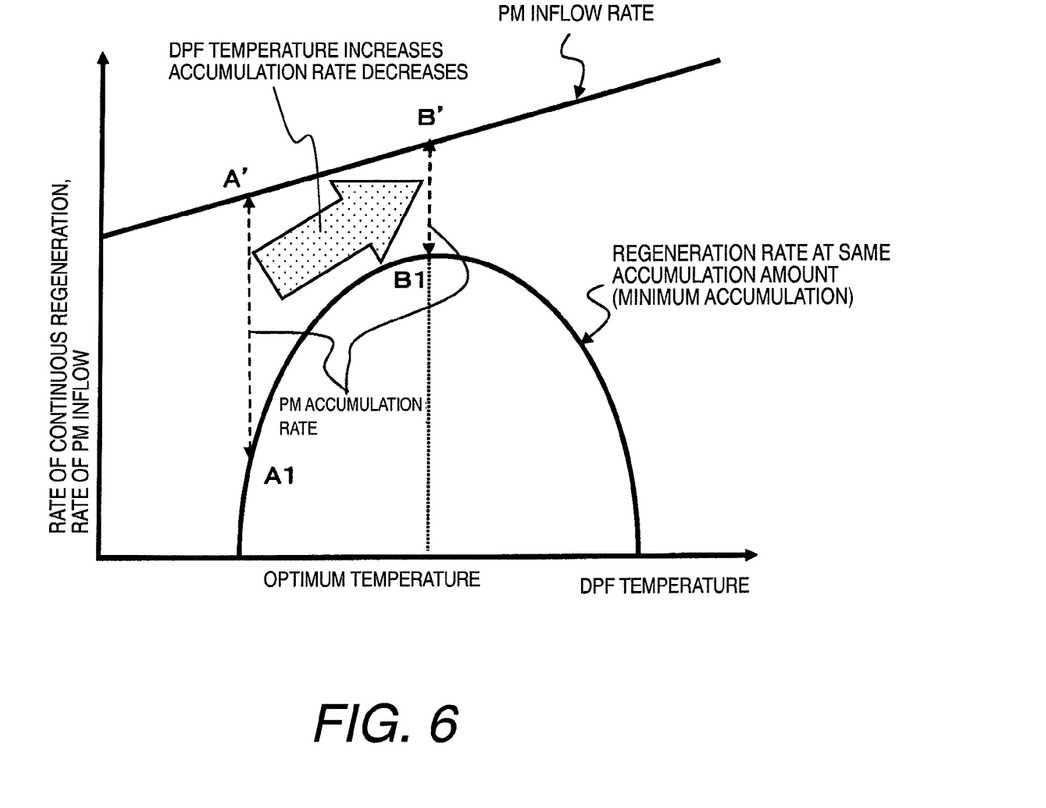
FIG. 6 is a graph illustrating an example in which the particulate matter accumulation rate is decreased by executing continuous regeneration control so as to increase the filter temperature.

For example, in FIG. 6, if the current oxidation removal rate is at a point A1, then the difference between a point A' and the point A1 indicates the accumulation rate. Although continuous regeneration is occurring, the amount of accumulated particulate matter increases because the rate at which particulate matter flows into the particulate filter 28 is higher than the oxidation removal rate.

Similarly, if the oxidation removal rate for a case in which continuous regeneration control is executed is at a point B1 in FIG. 6, then the difference between a point B' and the point B1 indicates the accumulation rate. As shown in the figure, by executing continuous regeneration control, the particulate matter accumulation rate is reduced. Although the amount of accumulated particulate matter continuous to increase, the progress of the accumulation is suppressed.

Figure 7:
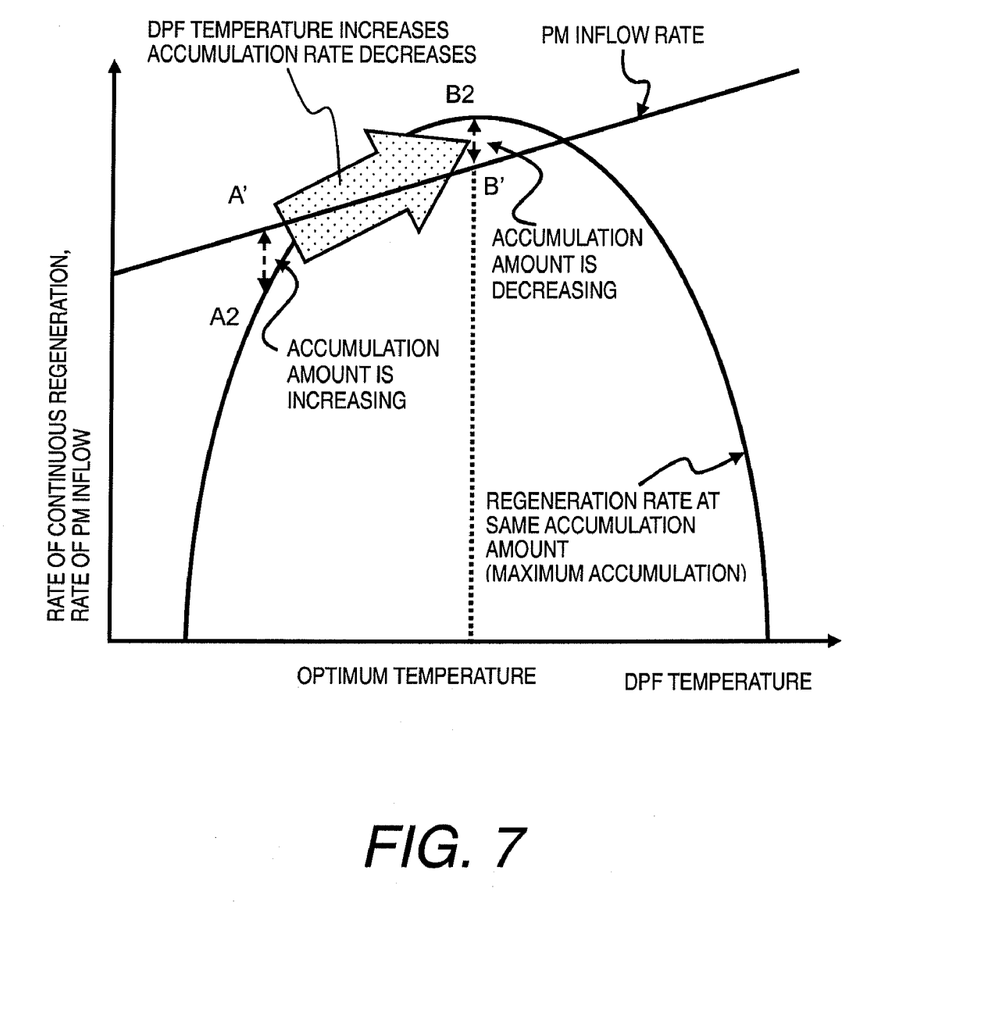
FIG. 7 is a graph illustrating an example in which the amount of particulate matter is changed from an accumulating state to a decreasing state by executing continuous regeneration control so as to increase the filter temperature.

FIG. 7 illustrates a case in which the current oxidation removal rate is at a point A2 because the amount of accumulated particulate matter is large. The difference between the particulate matter inflow rate A' and the oxidation removal rate A2 is small and the rate of the particulate matter accumulation is comparatively small. In this case, if continuous regeneration control is executed, the oxidation removal rate moves to a point B2 that exceeds the inflow rate B' such that the amount of accumulated particulate matter decreases.

Thus, as explained above, the continuous regeneration control is executed when the electronic control unit 6 (operation permitting component) determines that the progress (rate) of the particulate matter accumulation can be slowed or that the amount of accumulated particulate matter can be reduced by executing the continuous regeneration control.

The continuous regeneration control will now be explained. In step S111, the electronic control unit 6 determines if the temperature of the particulate filter 28 is near an optimum temperature (e.g., 300° C.).

If the temperature of the particulate filter 28 is not near the optimum temperature (e.g., 300° C.), then the electronic control unit 6 proceeds to step S112.

In step S112, the electronic control unit 6 determines if the current temperature of the particulate filter 28 is higher or lower than the optimum temperature.

If the current temperature of the particulate filter 28 is lower than the optimum temperature, then the electronic control unit 6 proceeds to step S113 and controls the selector valves 4e such that the amount of exhaust gas flowing to the bypass passage 4d (amount of bypass exhaust gas) is increased and the amount of exhaust gas flowing to the cooler 4c is decreased.

As a result, the temperature of the exhaust gas recirculated to the air induction system increases and, thus, the temperature of the intake air increases, the temperature of the exhaust gas increases, and the temperature of the particulate filter increases toward the optimum temperature.

In parallel with the control of the selector valves 4e, the electronic control unit 6 controls the opening degree of the exhaust gas recirculation control valve 4b to a larger value in accordance with the increase in the temperature of the recirculated exhaust gas such that the exhaust gas recirculation rate is held substantially constant.

Figure 8:
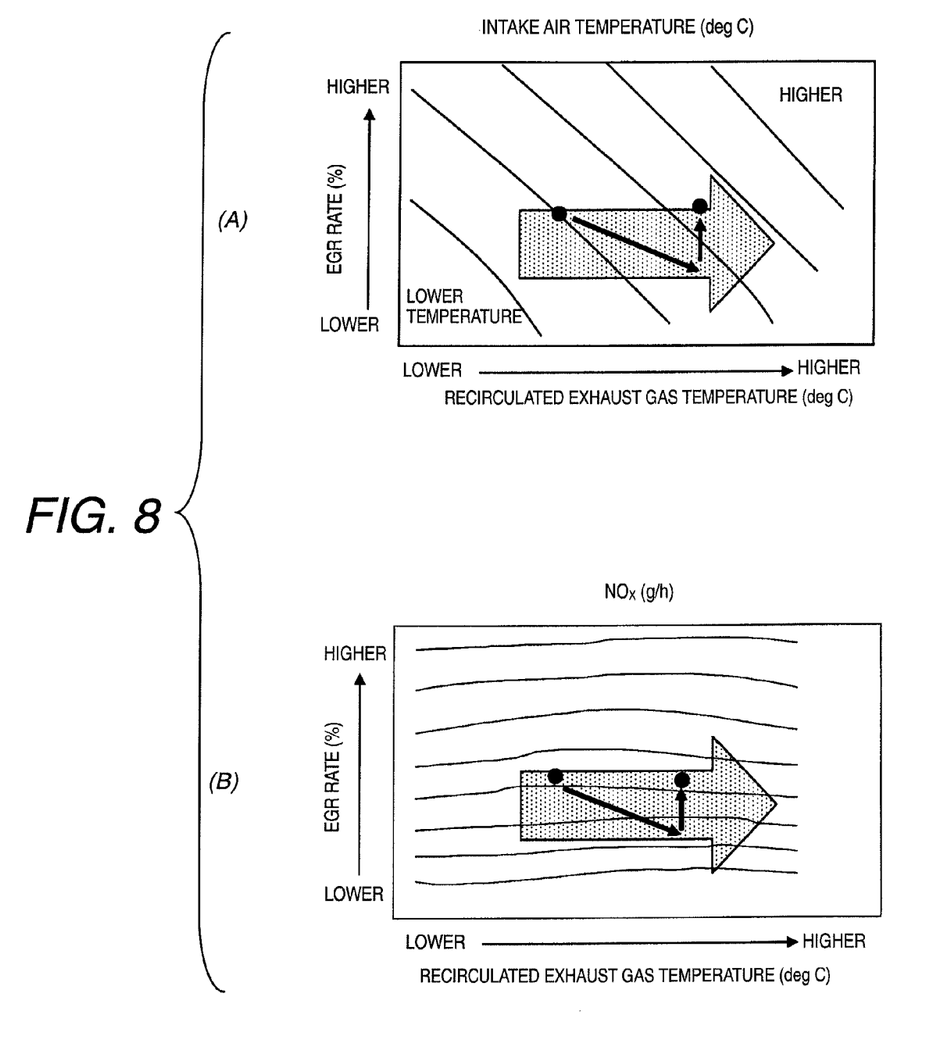
FIG. 8 is a pair of plots illustrating a control executed in order increase the temperature of the recirculated exhaust gas without changing the exhaust gas recirculation rate.

As shown in plot (A) of FIG. 8, when the temperature of the recirculated exhaust gas is increased, the density of the recirculated exhaust gas decreases. Thus, the actual exhaust gas recirculation rate will decrease if the exhaust gas recirculation control valve 4b is not adjusted. Meanwhile, as shown in plot (B) of FIG. 8, the amount of NOx discharged from the engine 1 increases. Thus, adjusting the temperature of the filter 28 to the optimum value causes the concentration of nitrogen dioxide ($NO_2$) to change as well.

Therefore, when the temperature of the recirculated exhaust gas is increased in order to make the temperature of the filter 28 rise, simultaneously the opening degree of the exhaust gas recirculation control valve 4b is increased such that the exhaust gas recirculation rate, i.e., the amount of NOx discharged from the engine 1 is held substantially constant.

Meanwhile, if it determines in step S112 that the temperature of the particulate filter 28 is higher than the optimum temperature, then the electronic control unit 6 proceeds to step S114 and controls the selector valves 4e such that the amount of exhaust gas flowing to the bypass passage 4d (amount of bypass exhaust gas) is decreased and the amount of exhaust gas flowing to the cooler 4c is increased. The temperature of the recirculated exhaust gas decreases and causes the temperature of the intake air and, thus, the temperature of the exhaust gas exiting the engine 1 to decrease. As a result, the temperature of the filter 28 decreases.

Simultaneously, the electronic control unit 6 revises the opening degree of the exhaust gas recirculation control valve 4*b* to a smaller value so as to compensate for the increase in the exhaust gas recirculation rate that results from decreasing the temperature of the recirculated exhaust gas.

By repeating the control described above, the temperature of the filter 28 can be adjusted to a temperature near the optimum temperature without changing the exhaust gas recirculation rate (amount of NOx discharged from the engine 1).

When the temperature of the filter 28 has been adjusted to a temperature near the optimum temperature, the electronic control unit 6 proceeds to step S115 and determines if the concentration of $NO_2$ in the particulate filter 28 is close to the optimum value.

If the $NO_2$ concentration is close to the optimum concentration, then the temperature and the $NO_2$ concentration are both at the optimum values and the electronic control unit 6 ends the control routine without changing the opening degree of the exhaust gas recirculation control valve 4*b* or the amount of exhaust gas that bypasses the cooler 4*c* (i.e., the settings of the selector valves 4*e*).

If the $NO_2$ concentration is not close to the optimum concentration, then the electronic control unit 6 proceeds to step S116 and determines if the current concentration of $NO_2$ in the filter 28 is higher or lower than the optimum concentration.

If the current $NO_2$ concentration in the filter 28 is lower than the optimum concentration, then the electronic control unit 6 proceeds to step S117 and revises the opening degree of the exhaust gas recirculation control valve 4*b* (i.e., the exhaust gas recirculation rate) to a smaller value so as to increase the concentration of NOx discharged from the engine 1. At the same time, the electronic control unit 6 controls the selector valves 4*e* so as to increase the amount of exhaust gas flowing to the bypass passage 4*d* (bypass exhaust gas amount) so that the intake air temperature (and thus the temperature of the filter 28) will not decrease due to the decrease in the exhaust gas recirculation rate. In other words, the electronic control unit 6 increases the temperature of the recirculated exhaust gas by decreasing the amount of exhaust gas flowing to the cooler 4*c*.

Figure 9:
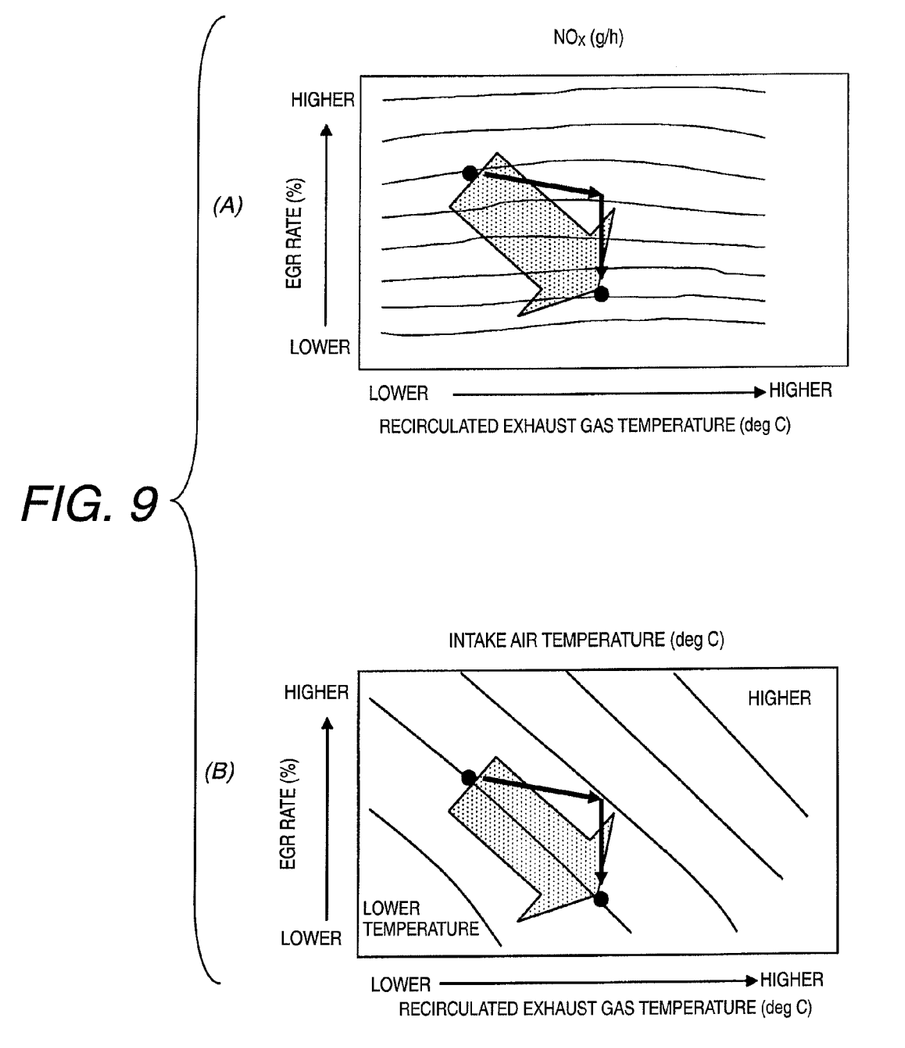
FIG. 9 is a pair of plots for explaining a control executed in order increase the amount of NOx discharged from the engine without changing the exhaust gas temperature (filter temperature)

As shown in plot (A) of FIG. 9, when the temperature of the recirculated exhaust gas is increased, the density of the recirculated exhaust gas decreases and the actual exhaust gas recirculation rate decreases, as described previously. If the opening degree of the exhaust gas recirculation control valve 4*b* is reduced simultaneously, then the NOx concentration of the engine exhaust gas can be increased while the temperature of the recirculated exhaust gas is increased. As a result, as shown in plot (B) of FIG. 9, the exhaust gas recirculation rate can be decreased while holding the exhaust gas temperature (temperature of the filter 28) substantially constant.

Conversely, if the current $NO_2$ concentration in the filter 28 is higher than the optimum concentration, then the electronic control unit 6 proceeds to step S118 and revises the opening degree of the exhaust gas recirculation control valve 4*b* (i.e., the exhaust gas recirculation rate) to a larger value so as to decrease the concentration of NOx discharged from the engine 1. At the same time, the electronic control unit 6 controls the selector valves 4*e* so as to decrease the amount of exhaust gas flowing to the bypass passage 4*d* so that the intake air temperature (and thus the temperature of the filter 28) will not increase due to the increase in the exhaust gas recirculation rate. In other words, the electronic control unit 6 decreases the temperature of the recirculated exhaust gas by increasing the amount of exhaust gas flowing to the cooler 4*c*.

By repeating the control described above, the $NO_2$ concentration in the filter 28 is adjusted to the optimum concentration. As a result, by controlling both the temperature of the filter 28 and the $NO_2$ concentration in the filter 28 to the optimum values, the efficiency of continuous regeneration using $NO_2$ can be maximized.

Thus, compared to a case in which the temperature of the filter 28 and the concentration of $NO_2$ in the filter 28 are not controlled, the oxidation removal of particulate matter by continuous regeneration is accelerated and the effect of suppressing the accumulation of particulate matter in the filter 28 is increased.

If the accumulation of particulate matter can be suppressed with continuous regeneration, then more time will be required for the amount of accumulated particulate matter to reach the vicinity of the saturation amount and the frequency with which the forced temperature increase regeneration control is executed can be reduced.

When a main fuel injection timing is retarded or a post fuel injection is executed during the forced temperature increase regeneration control, fuel sticks to the cylinder bores of the engine and dilutes the engine oil. Furthermore, the fuel efficiency of the engine declines. However, this embodiment reduces the dilution of the engine oil and suppresses the decline of the fuel efficiency that results from executing the forced temperature increase regeneration control by reducing the frequency with which the force temperature increase regeneration control is executed.

Figure 10:
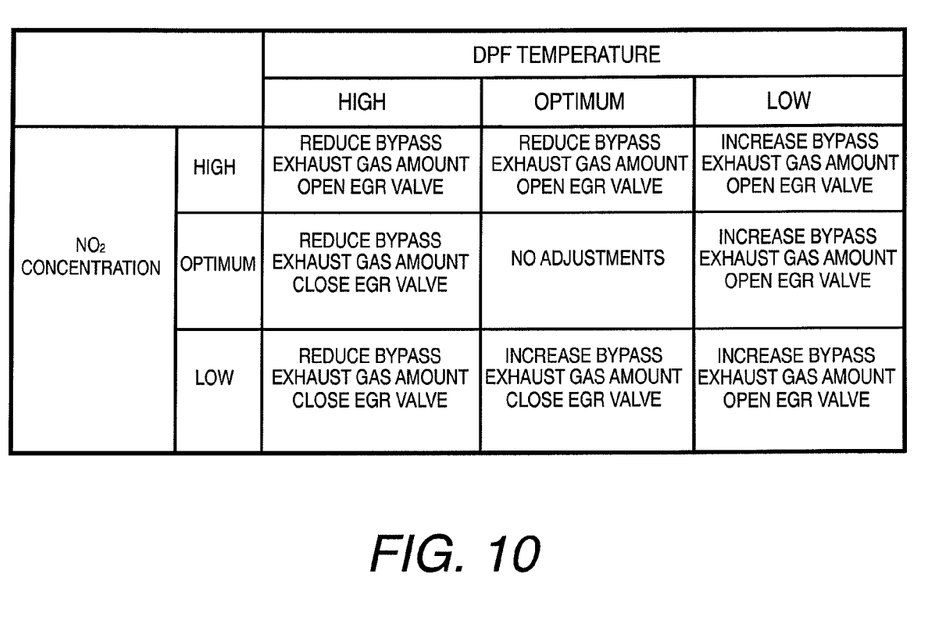
FIG. 10 is a table illustrating the correlations among the filter temperature, the $NO_2$ concentration, the bypass exhaust gas amount, and the opening degree of the exhaust gas recirculation control valve.

FIG. 10 summarizes the control of the exhaust gas recirculation control valve 4*b* (EGR valve) and the selector valves 4*e* (bypass exhaust gas amount) executed in order to control the temperature of the filter 28 and the $NO_2$ concentration in the filter 28 to the optimum values.

As shown in FIG. 10, the opening degree of the exhaust gas recirculation control valve 4*b* (EGR valve) and the bypass exhaust gas amount established by the selector valves 4*e* are held constant when the temperature of the filter 28 and the $NO_2$ concentration in the filter 28 are both at the respective optimum values. If, for example, the temperature of the filter 28 becomes higher than the optimum temperature, then the temperature of the recirculated exhaust gas is decreased by decreasing the amount of exhaust gas that bypasses the cooler 4*c* (bypass exhaust gas amount). However, if the opening degree of the exhaust gas recirculation control valve 4*b* is left unchanged, then decreasing the temperature of the recirculated exhaust gas will cause the exhaust gas recirculation rate to increase and, thus, the $NO_2$ concentration to deviate from the optimum value. Therefore, the opening degree of the exhaust gas recirculation control valve 4*b* (EGR valve) is decreased in order to prevent the exhaust gas recirculation rate from changing.

Conversely, if the temperature of the filter 28 becomes lower than the optimum temperature, then the temperature of the recirculated exhaust gas is increased by increasing the amount of exhaust gas that bypasses the cooler 4*c* (bypass exhaust gas amount). However, if the opening degree of the exhaust gas recirculation control valve 4*b* is left unchanged, then increasing the temperature of the recirculated exhaust gas will cause the exhaust gas recirculation rate to decrease and, thus, the $NO_2$ concentration to deviate from the optimum value. Therefore, the opening degree of the exhaust gas recirculation control valve 4*b* (EGR valve) is increased in order to prevent the exhaust gas recirculation rate from changing.

Meanwhile, if the $NO_2$ concentration becomes higher than the optimum value, then the amount of NOx discharged from the engine 1 is decreased by increasing the opening degree of the exhaust gas recirculation valve 4*b* (EGR valve). However, if the amount of recirculated exhaust gas that bypasses the cooler 4*c* (the bypass exhaust gas amount) is left unchanged, then increasing the amount of recirculated exhaust gas will cause the exhaust gas temperature to increase and, thus, the temperature of the filter 28 to become higher than the optimum temperature. Therefore, the bypass exhaust gas amount is decreased in order to prevent the exhaust gas temperature from increasing due to the increase in the amount of recirculated exhaust gas.

Conversely, if the $NO_2$ concentration becomes lower than the optimum value, then the amount of NOx discharged from the engine 1 is increased by decreasing the opening degree of the exhaust gas recirculation valve 4b (EGR valve). However, if the amount of recirculated exhaust gas that bypasses the cooler 4c (the bypass exhaust gas amount) is left unchanged, then decreasing the amount of recirculated exhaust gas will cause the exhaust gas temperature to decrease and, thus, the temperature of the filter 28 to become lower than the optimum temperature. Therefore, the bypass exhaust gas amount is increased in order to prevent the exhaust gas temperature from decreasing due to the decrease in the amount of recirculated exhaust gas.

If the temperature of the filter 28 is higher than the optimum temperature and the $NO_2$ concentration is higher than the optimum value, then the temperature of the recirculated exhaust gas is lowered by decreasing the bypass exhaust gas amount and the amount of NOx discharged from the engine 1 is decreased by increasing the opening degree of the exhaust gas recirculation control valve 4b. Conversely, if the temperature of the filter 28 is lower than the optimum temperature and the $NO_2$ concentration is lower than the optimum value, then the temperature of the recirculated exhaust gas is raised by increasing the bypass exhaust gas amount and the amount of NOx discharged from the engine 1 is increased by decreasing the opening degree of the exhaust gas recirculation control valve 4b.

Since the actual exhaust gas recirculation rate increases when the temperature of the recirculated exhaust gas is lowered by decreasing the bypass exhaust gas amount, decreasing the bypass exhaust gas amount serves both to decrease the temperature of the filter 28 and to decrease the $NO_2$ concentration. Conversely, since the actual exhaust gas recirculation rate decreases when the temperature of the recirculated exhaust gas is raised by increasing the bypass exhaust gas amount, increasing the bypass exhaust gas amount serves both to increase the temperature of the filter 28 and to increase the $NO_2$ concentration.

Although in the embodiment described above the oxidation catalytic converter 27 and the particulate filter 28 are provided as separate entities, it is acceptable have an oxidation catalytic converter arranged on the upstream side of the particulate filter 28 so as to form a one-piece integral unit.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An exhaust gas cleaning apparatus comprising:
    an exhaust gas particulate filter arranged in an exhaust passage of an internal combustion engine for capturing particulate matter in exhaust gas from the internal combustion engine;
    an oxidation catalytic converter arranged upstream of the exhaust gas particulate filter in the exhaust passage; and
    a regeneration control component configured to include a control to simultaneously increase one of an exhaust gas recirculation rate and a temperature of recirculated exhaust gas being recirculated to an air induction system of the internal combustion engine and decrease the one is not being increased of the exhaust gas recirculation rate and the temperature of the recirculated exhaust gas such that one of a temperature of the exhaust gas particulate filter and a concentration of nitrogen dioxide in the exhaust gas particulate filter is adjusted to a predetermined value for burning the particulate matter captured in the exhaust gas particulate filter by nitrogen dioxide generated by the oxidation catalytic converter while maintaining the other of the temperature of the exhaust gas particulate filter and the concentration of the nitrogen dioxide in the exhaust gas particulate filter.

2. The exhaust gas cleaning apparatus as recited in claim 1, wherein
    the regeneration control component is further configured to change an amount of the recirculated exhaust gas being recirculated to the air induction system for counterbalancing a change in the recirculation rate of the recirculated exhaust gas resulting from changing the temperature of the recirculated exhaust gas.

3. The exhaust gas cleaning apparatus as recited in claim 1, wherein
    the regeneration control component is further configured to change the temperature of the recirculated exhaust gas being recirculated to the air induction system for counterbalancing a change in exhaust gas temperature resulting from changing the recirculation rate of the recirculated exhaust gas.

4. An exhaust gas cleaning apparatus comprising:
an exhaust gas particulate filter arranged in an exhaust passage of an internal combustion engine for capturing particulate matter in exhaust gas from the internal combustion engine;
an oxidation catalytic converter arranged upstream of the exhaust gas particulate filter in the exhaust passage;
a regeneration control component configured to control an exhaust gas recirculation rate and a temperature of recirculated exhaust gas being recirculated to an air induction system of the internal combustion engine for controlling a temperature of the exhaust gas particulate filter and a concentration of nitrogen dioxide in the exhaust gas particulate filter such that nitrogen dioxide generated by the oxidation catalytic converter is used to burn the particulate matter captured in the exhaust gas particulate filter;
an exhaust gas recirculation passage arranged to recirculate the exhaust gas to the air induction system;
an exhaust gas recirculation control valve arranged in the exhaust gas recirculation passage to control the recirculation rate of the recirculated exhaust gas being recirculated to the air induction system;
a cooler arranged in the exhaust gas recirculation passage to cool the recirculated exhaust gas;
a bypass passage arranged to allow the recirculated exhaust gas to bypass the cooler; and
a selector valve arranged to change a ratio of an amount of the recirculated exhaust gas that passes through the cooler and an amount of the recirculated exhaust gas that bypasses the cooler,
the regeneration control component being further configured to control the temperature of the recirculated exhaust gas being recirculated to the air induction system by controlling the selector valve so as to change the ratio and to control the recirculation rate of the recirculated exhaust gas being recirculated to the air induction system by controlling the exhaust gas recirculation control valve.

5. The exhaust gas cleaning apparatus as recited in claim 4, wherein
the regeneration control component is further configured to control the selector valve to increase the amount of the recirculated exhaust gas flowing into the bypass passage and to control the exhaust gas recirculation control valve to increase an opening degree of the exhaust gas recirculation control valve, when the temperature of the exhaust gas particulate filter is lower than a target temperature so that the temperature of the recirculated exhaust gas increases for increasing the exhaust gas temperature while holding the exhaust gas recirculation rate substantially fixed.

6. The exhaust gas cleaning apparatus as recited in claim 4, wherein
the regeneration control component is further configured to control the selector valve to decrease the amount of the recirculated exhaust gas flowing into the bypass passage and to control the exhaust gas recirculation control valve to reduce an opening degree of the exhaust gas recirculation control valve, when the temperature of the exhaust gas particulate filter is higher than a target temperature so that the temperature of the recirculated exhaust gas is lowered to decrease the exhaust gas temperature while holding the exhaust gas recirculation rate substantially fixed.

7. The exhaust gas cleaning apparatus as recited in claim 4, wherein
the regeneration control component is further configured to control the selector valve to increase the amount of the recirculated exhaust gas flowing into the bypass passage and to control the exhaust gas recirculation control valve to reduce an opening degree of the exhaust gas recirculation control valve, when the concentration of the nitrogen dioxide in the exhaust gas particulate filter is lower than a target concentration so that the exhaust gas recirculation rate is lowered to increase an amount of NOx discharged from the internal combustion engine while holding the exhaust gas temperature substantially fixed.

8. The exhaust gas cleaning apparatus as recited in claim 4, wherein
the regeneration control component is further configured to control the selector valve to decrease the amount of the recirculated exhaust gas flowing into the bypass passage and to control the exhaust gas recirculation control valve to increase an opening degree of the exhaust gas recirculation control valve, when the concentration of the nitrogen dioxide in the exhaust gas particulate filter is higher than a target concentration so that the exhaust gas recirculation rate increases to decrease an amount of NOx discharged from the internal combustion engine while holding the exhaust gas temperature substantially fixed.

9. An exhaust gas cleaning apparatus comprising:
an exhaust gas particulate filter arranged in an exhaust passage of an internal combustion engine for capturing particulate matter in exhaust gas from the internal combustion engine;
an oxidation catalytic converter arranged upstream of the exhaust gas particulate filter in the exhaust passage;
a regeneration control component configured to control an exhaust gas recirculation rate and a temperature of recirculated exhaust gas being recirculated to an air induction system of the internal combustion engine for controlling a temperature of the exhaust gas particulate filter and a concentration of nitrogen dioxide in the exhaust gas particulate filter such that nitrogen dioxide generated by the oxidation catalytic converter is used to burn the particulate matter captured in the exhaust gas particulate filter;
a comparing component configured to compare a rate at which the particulate matter will accumulate in the exhaust gas particulate filter if the regeneration control component does not control the temperature and the concentration of the nitrogen dioxide to a rate at which the particulate matter will accumulate in the exhaust gas particulate filter if the regeneration control component does control the temperature and the concentration of the nitrogen dioxide; and
an operation permitting component configured to permit operation of the regeneration control component when a comparison result obtained by the comparing component indicates that the rate at which the particulate matter accumulates will decrease more if the regeneration control component controls the temperature and the concentration of nitrogen dioxide than if the regeneration control component does not control the temperature and the concentration of the nitrogen dioxide.

10. The exhaust gas cleaning apparatus as recited in claim 9, wherein
the comparing component is configured to estimate the rate at which the particulate matter accumulates in the exhaust gas particulate filter based on a rate at which the particulate matter flows into the exhaust gas particulate filter and a rate at which the particulate matter in the exhaust gas particulate filter is removed by oxidation.

11. The exhaust gas cleaning apparatus as recited in claim 9, wherein
the comparing component is configured to estimate the rate at which the particulate matter is removed by oxidation based at least one of a temperature of the exhaust gas particulate filter, an amount of the particulate matter accumulated in the exhaust gas particulate filter, and a concentration of nitrogen dioxide in the exhaust gas particulate filter.

12. The exhaust gas cleaning apparatus as recited in claim 1, further comprising
a forced temperature increase regeneration component configured to prohibit operation of the regeneration control component and to raise an exhaust gas temperature by increasing an amount of unburned components in the exhaust gas when an amount of particulate matter accumulated in the exhaust gas particulate filter exceeds a prescribed value.

13. A method of cleaning exhaust gas comprising:
passing exhaust gas from an internal combustion engine through an oxidation catalytic converter and an exhaust gas particulate filter arranged downstream of the oxidation catalytic converter; and
providing a control to simultaneously increase one of an exhaust gas recirculation rate and a temperature of recirculated exhaust gas being recirculated to an air induction system of the internal combustion engine and decrease the one is not being increased of the exhaust gas recirculation rate and the temperature of the recirculated exhaust gas such that one of a temperature of the exhaust gas particulate filter and a concentration of nitrogen dioxide in the exhaust gas particulate filter is adjusted to a predetermined value for burning the particulate matter captured in the exhaust gas particulate filter by nitrogen dioxide generated by the oxidation catalytic converter while maintaining the other of the temperature of the exhaust gas particulate filter and the concentration of the nitrogen dioxide in the exhaust gas particulate filter.

14. The method as recited in claim 13, wherein
the controlling of the exhaust gas recirculation rate and the temperature of recirculated exhaust gas includes changing an amount of the recirculated exhaust gas being recirculated to the air induction system for counterbalancing a change in the recirculation rate of the recirculated exhaust gas resulting from changing the temperature of the recirculated exhaust gas.

15. The method as recited in claim 13, wherein
the controlling of the exhaust gas recirculation rate and the temperature of recirculated exhaust gas includes changing the temperature of the recirculated exhaust gas being recirculated to the air induction system for counterbalancing a change in exhaust gas temperature resulting from changing the recirculation rate of the recirculated exhaust gas.

16. A method of cleaning exhaust gas comprising:
passing exhaust gas from an internal combustion engine through an oxidation catalytic converter and an exhaust gas particulate filter arranged downstream of the oxidation catalytic converter; and
controlling an exhaust gas recirculation rate and a temperature of recirculated exhaust gas being recirculated to an air induction system of the internal combustion engine for controlling a temperature of the exhaust gas particulate filter and a concentration of nitrogen dioxide in the exhaust gas particulate filter such that nitrogen dioxide generated by the oxidation catalytic converter is used to burn the particulate matter captured in the exhaust gas particulate filter,
the controlling of the exhaust gas recirculation rate and the temperature of recirculated exhaust gas including controlling the temperature of the recirculated exhaust gas being recirculated to the air induction system via an exhaust gas recirculation passage arranged to recirculate the exhaust gas to the air induction system by controlling a selector valve so as to change a ratio of an amount of the recirculated exhaust gas that passes through a cooler disposed in the exhaust gas recirculation passage and an amount of the recirculated exhaust gas that bypasses the cooler, and
the controlling of the exhaust gas recirculation rate and the temperature of recirculated exhaust gas further including controlling the recirculation rate of the recirculated exhaust gas being recirculated to the air induction system by controlling an exhaust gas recirculation control valve disposed in the exhaust gas recirculation passage.

17. The method as recited in claim 16, wherein
the controlling of the exhaust gas recirculation rate and the temperature of recirculated exhaust gas further includes controlling the selector valve to increase the amount of the recirculated exhaust gas flowing into the bypass passage and controlling the exhaust gas recirculation control valve to increase an opening degree of the exhaust gas recirculation control valve, when the temperature of the exhaust gas particulate filter is lower than a target temperature so that the temperature of the recirculated exhaust gas increases for increasing the exhaust gas temperature while holding the exhaust gas recirculation rate substantially fixed.

18. The method as recited in claim 16, wherein
the controlling of the exhaust gas recirculation rate and the temperature of recirculated exhaust gas further includes controlling the selector valve to decrease the amount of the recirculated exhaust gas flowing into the bypass passage and controlling the exhaust gas recirculation control valve to reduce an opening degree of the exhaust gas recirculation control valve, when the temperature of the exhaust gas particulate filter is higher than a target temperature so that the temperature of the recirculated exhaust gas is lowered to decrease the exhaust gas temperature while holding the exhaust gas recirculation rate substantially fixed.

19. The method as recited in claim 16, wherein
the controlling of the exhaust gas recirculation rate and the temperature of recirculated exhaust gas further includes controlling the selector valve to increase the amount of the recirculated exhaust gas flowing into the bypass passage and controlling the exhaust gas recirculation control valve to reduce an opening degree of the exhaust gas recirculation control valve, when the concentration of the nitrogen dioxide in the exhaust gas particulate filter is lower than a target concentration so that the exhaust gas recirculation rate is lowered to increase an amount of NOx discharged from the internal combustion engine while holding the exhaust gas temperature substantially fixed.

20. The method as recited in claim 16, wherein
the controlling of the exhaust gas recirculation rate and the temperature of recirculated exhaust gas further includes controlling the selector valve to decrease the amount of the recirculated exhaust gas flowing into the bypass passage and controlling the exhaust gas recirculation control valve to increase an opening degree of the exhaust gas recirculation control valve, when the concentration of the nitrogen dioxide in the exhaust gas particulate filter is higher than a target concentration so that the exhaust gas recirculation rate increases to decrease an amount of NOx discharged from the internal combustion engine while holding the exhaust gas temperature substantially fixed.

21. A method of cleaning exhaust gas comprising:
passing exhaust gas from an internal combustion engine through an oxidation catalytic converter and an exhaust gas particulate filter arranged downstream of the oxidation catalytic converter;
controlling an exhaust gas recirculation rate and a temperature of recirculated exhaust gas being recirculated to an air induction system of the internal combustion engine for controlling a temperature of the exhaust gas particulate filter and a concentration of nitrogen dioxide in the exhaust gas particulate filter such that nitrogen dioxide generated by the oxidation catalytic converter is used to burn the particulate matter captured in the exhaust gas particulate filter;
comparing a rate at which the particulate matter will accumulate in the exhaust gas particulate filter if the controlling of the exhaust gas recirculation rate and the temperature of recirculated exhaust gas is not performed to control the temperature and the concentration of the nitrogen dioxide to a rate at which the particulate matter will accumulate in the exhaust gas particulate filter if the controlling of the exhaust gas recirculation rate and the temperature of recirculated exhaust gas is performed to control the temperature and the concentration of the nitrogen dioxide so as to obtain a comparison result; and
permitting the controlling of the exhaust gas recirculation rate and the temperature of recirculated exhaust gas to be performed when the comparison result indicates that the rate at which the particulate matter accumulates will decrease more if the controlling of the exhaust gas recirculation rate and the temperature of recirculated exhaust gas is performed to control the temperature and the concentration of the nitrogen dioxide than if the controlling of the exhaust gas recirculation rate and the temperature of recirculated exhaust gas is not performed to control the temperature and the concentration of the nitrogen dioxide.

22. The method as recited in claim 21, wherein
the comparison result is obtained by estimating the rate at which the particulate matter accumulates in the exhaust gas particulate filter based on a rate at which the particulate matter flows into the exhaust gas particulate filter and a rate at which the particulate matter in the exhaust gas particulate filter is removed by oxidation.

23. The method as recited in claim 21, wherein
the comparison result is obtained by estimating the rate at which the particulate matter is removed by oxidation based at least one of a temperature of the exhaust gas particulate filter, an amount of the particulate matter accumulated in the exhaust gas particulate filter, and a concentration of nitrogen dioxide in the exhaust gas particulate filter.

24. The method as recited in claim 13, further comprising
prohibiting the controlling of the exhaust gas recirculation rate and the temperature of recirculated exhaust gas to control the temperature and the concentration of the nitrogen dioxide, and raising an exhaust gas temperature by increasing an amount of unburned components in the exhaust gas when an amount of particulate matter accumulated in the exhaust gas particulate filter exceeds a prescribed value.

25. An exhaust gas cleaning apparatus comprising:
an exhaust gas particulate filter arranged in an exhaust passage of an internal combustion engine for capturing particulate matter in exhaust gas from the internal combustion engine;
an oxidation catalytic converter arranged upstream of the exhaust gas particulate filter in the exhaust passage; and
a regeneration control component configured to control simultaneously both an exhaust gas recirculation rate and a temperature of recirculated exhaust gas being recirculated to an air induction system of the internal combustion engine for controlling a temperature of the exhaust gas particulate filter and a concentration of nitrogen dioxide in the exhaust gas particulate filter to respective target values such that nitrogen dioxide generated by the oxidation catalytic converter is used to burn the particulate matter captured in the exhaust gas particulate filter, the temperature of the recirculated exhaust gas being controlled by variably adjusting a mixture rate of a first part of the exhaust gas and a second part of the exhaust gas that is cooled more than the first part of the exhaust gas.

26. A method of cleaning exhaust gas comprising:
passing exhaust gas from an internal combustion engine through an oxidation catalytic converter and an exhaust gas particulate filter arranged downstream of the oxidation catalytic converter; and
controlling simultaneously both an exhaust gas recirculation rate and a temperature of recirculated exhaust gas being recirculated to an air induction system of the internal combustion engine for controlling a temperature of the exhaust gas particulate filter and a concentration of nitrogen dioxide in the exhaust gas particulate filter to respective target values such that nitrogen dioxide generated by the oxidation catalytic converter is used to burn the particulate matter captured in the exhaust gas particulate filter, the temperature of the recirculated exhaust gas being controlled by variably adjusting a mixture rate of a first part of the exhaust gas and a second part of the exhaust gas that is cooled more than the first part of the exhaust gas.

* * * * *